(12) United States Patent
Huang et al.

(10) Patent No.: US 6,645,657 B2
(45) Date of Patent: Nov. 11, 2003

(54) SOL-GEL COATED CATHODE SIDE HARDWARE FOR CARBONATE FUEL CELLS

(75) Inventors: Chao Huang, Danbury, CT (US); Jian Li, New Milford, CT (US)

(73) Assignee: FuelCell Energy, Inc., Danbury, CT (US)

(*) Notice: Subject to any disclaimer, the term of this patent is extended or adjusted under 35 U.S.C. 154(b) by 0 days.

(21) Appl. No.: 09/848,023

(22) Filed: May 3, 2001

(65) Prior Publication Data

US 2002/0164522 A1 Nov. 7, 2002

(51) Int. Cl.[7] .............................. H01M 8/02; H01M 8/14
(52) U.S. Cl. ............................................ 429/34; 427/115
(58) Field of Search .............................. 429/34–39, 233, 429/245; 427/115; 29/623.5

(56) References Cited

U.S. PATENT DOCUMENTS

| | | | | |
|---|---|---|---|---|
| 5,300,376 A | * | 4/1994 | Plichta et al. | 429/231.1 |
| 5,399,438 A | | 3/1995 | Tateishi et al. | |
| 5,643,690 A | | 7/1997 | Tateishi et al. | |
| 5,698,337 A | | 12/1997 | Nitschke et al. | |
| 5,874,374 A | | 2/1999 | Ong | |
| 5,885,309 A | * | 3/1999 | Sitters et al. | 29/623.1 |

FOREIGN PATENT DOCUMENTS

| | | |
|---|---|---|
| DE | 19523635 | 7/1996 |
| JP | 61024156 | 2/1986 |
| JP | 61071559 | 4/1986 |
| JP | 6305294 | 11/1994 |
| JP | 8020846 | 1/1996 |
| WO | WO 96/20507 | * 7/1996 |

OTHER PUBLICATIONS

English of Translation of WO 96/20507 published on Jul. 4, 1996.*
Lada et al. ("Preparation and Characterization of $LiCoO_2$ and $LiMg_{0.05}Co_{0.95}O_2$ thin films on porous Ni/NiO cathodes for MCFC by complex sol–gel process (CSGP)" in, Materials Research Society Symposium Proceedings (Apr. 24–28, 2000), vol. 623, pp. 395–400).*
C. Yuh, Proceedings of Motten Carbonate Fuel Cell Technology, vol. 90–16, pp. 368–377 (1990) No month.
S. T. Kuk, et al., Abstracts 1996 Fuel Cell Seminar, pp. 367–370 No month.
S.A. Hong et al., Abstracts 1998 Fuel Cell Seminar, pp. 142–145 No month.

* cited by examiner

*Primary Examiner*—Susy Tsang-Foster
(74) *Attorney, Agent, or Firm*—Robin, Blecker & Daley

(57) ABSTRACT

A carbonate fuel cell comprising cathode side hardware having a thin coating of a conductive ceramic for providing corrosion resistance and a method of making the same.

4 Claims, 10 Drawing Sheets

SOL-GEL COATED CATHODE SIDE HARDWARE FOR CARBONATE FUEL CELLS

BACKGROUND OF THE INVENTION

This invention relates to molten carbonate fuel cells and, in particular, to cathode side hardware employed in such cells.

As used herein, the term "cathode side hardware" is defined as the current collector and/or the bipolar plate on the cathode side of a fuel cell. In molten carbonate fuel cells, the cathode-side hardware is in direct contact with the porous cathode in which alkali carbonate electrolyte is stored. FIG. 1 schematically shows such a fuel cell.

As shown, the fuel cell 1 comprises a cathode 2 and an anode 3. Between the cathode 2 and the anode 3 is a matrix 4 containing the alkali carbonate electrolyte. Adjacent the anode 3 is a corrugated current collector 3a and a bipolar plate 3b. Adjacent the cathode 2 is the cathode side hardware 5 comprising corrugated current collector 5a and bipolar plate 5b.

At the operation temperature (approximately 650° C.) of the cell 1, the stored electrolyte melts and wets the surface of the cathode-side hardware 5. Moreover, at this temperature, the cathode atmosphere comprises an oxidizing gas mixture including $O_2$, $N_2$, $H_2O$ and $CO_2$. Under these conditions, the cathode current collector, which is commonly formed from a low-cost austenitic stainless steel, is subjected to so-called hot corrosion.

More specifically, a multi-layer corrosion product is formed on the current collector surface. This corrosion product includes a porous outer layer which is a Fe-rich oxide which generally converts to $LiFeO_2$. The product also includes an underlying (inner) layer. This inner layer comprises spinel compounds (Fe, $Cr)_3O_4$, and is relatively dense. It also provides some corrosion protection for the current collector, i.e., protects the current collector from further attack.

As can be appreciated, the fuel cell 1 experiences significant ohmic voltage loss due to the interfacial resistance (about 60 $\Omega$-$cm^2$ at the beginning of life, equivalent to ~2% power loss) between the cathode and the cathode current collector resulting from the formation of this outer surface oxide (electrical resistivity ~300 $\Omega$-$cm^2$ for $LiFeO_2$). The interfacial electrical resistance continues to increase as the oxide thickens with time. It has been estimated that an approximately 2.5 $\mu$m thick layer of $LiFeO_2$ can cause more than 50 mV ohmic voltage loss at 160 mA/$cm^2$.

The hot corrosion of the current collector also accelerates electrolyte loss. This is due to the formation of the aforementioned Li-containing corrosion products, such as $LiFeO_2$, and K-containing corrosion products, such as $K_2CrO_4$, which consume valuable lithium and potassium carbonate electrolyte. Significant electrolyte loss, in turn, can cause electrode performance decay, ionic resistance increase, and reactant cross-over.

Accordingly, it has been recognized that the durability of a carbonate fuel cell can be enhanced by reducing the hot corrosion of the cathode-side hardware and the associated electrolyte loss. More particularly, it has been proposed to provide a protective and conductive oxide formation on the cathode-side hardware to realize low contact resistance and low electrolyte loss (C. Yuh, Proceedings of Molten Carbonate Fuel Cell Technology, Vol. 90–16, pp. 368–377 (1990)).

Specifically, efforts have been made in this regard in the prior art to identify a metallic alloy that has excellent corrosion resistance in the cathode environment for use in forming the cathode side hardware (U.S. Pat. No. 5,399,438, Japanese Patent Document 8020846, Japanese Patent Document 6305294, U.S. Pat. No. 5,643,690). Also, other efforts have been made to apply corrosion resistant coatings comprised of W, Mo, Ni, Cu, Cr, Co, Ag, or Pa to the hardware. Doping agents, such as cobalt, manganese, copper or magnesium, have additionally been applied to the hardware or used as a component of the steel alloy forming the hardware (German Patent DE 19523635, Japanese Patent Documents 61071559 and 61024156). The purpose of such doping is to change the composition of the corrosion products, lowering their electrical resistivity. In all the aforementioned coating and doping methods described above, a metallic coating is applied to the hardware surface prior to use.

In a number of other types of applications, so-called "sol-gel" type coatings, i.e., thin dense ceramic coatings, have been developed for corrosion protection (D. W. Richerson, "Modern Ceramic Engineering", Marcel Dekker, 1992). U.S. Pat. No. 5,874,374 describes a method for producing continuous thin film sol-gel type coatings as an electrical component for surface protection against harsh environments. These coatings are used for solid oxide fuel cells and electro-ceramic membranes, porous filters and membranes, and to provide surfaces with desired optical and decorative properties. In the method of this patent, a salt-polymeric aqueous solution is first converted to a metal cation/polymer gel. The metal cation/polymer gel is then further treated to form a structural mass or thin ceramic layer.

Conductive sol-gel $LiCoO_2$ coatings have also been developed for reducing NiO cathode corrosion (S. T. Kuk, et al., Abstracts 1996 Fuel Cell Seminar, pp. 367–370; S. W. Nam, et al., Abstracts 1998 Fuel Cell Seminar, pp. 142–145). In this case, the sol-gel precursor solution contains lithium acetate, potassium acetate, acrylic acid or PVA, and water. With this coating, the corrosion of the NiO cathode was found significantly reduced.

It is an object of the present invention to provide cathode side hardware which has improved performance characteristics;

It is also an object of the present invention to provide cathode side hardware which exhibits reduced susceptibility to hot corrosion;

It is yet a further object of the present invention to provide cathode side hardware which maintains a low electrical resistance with use.

SUMMARY OF THE INVENTION

The above and other objects are realized in cathode side hardware by forming the hardware to have a thin film of conductive ceramic coating. Preferably, the coating materials are $LiCoO_2$ or Co doped $LiFeO_2$ and the coating is realized using a sol-gel process.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
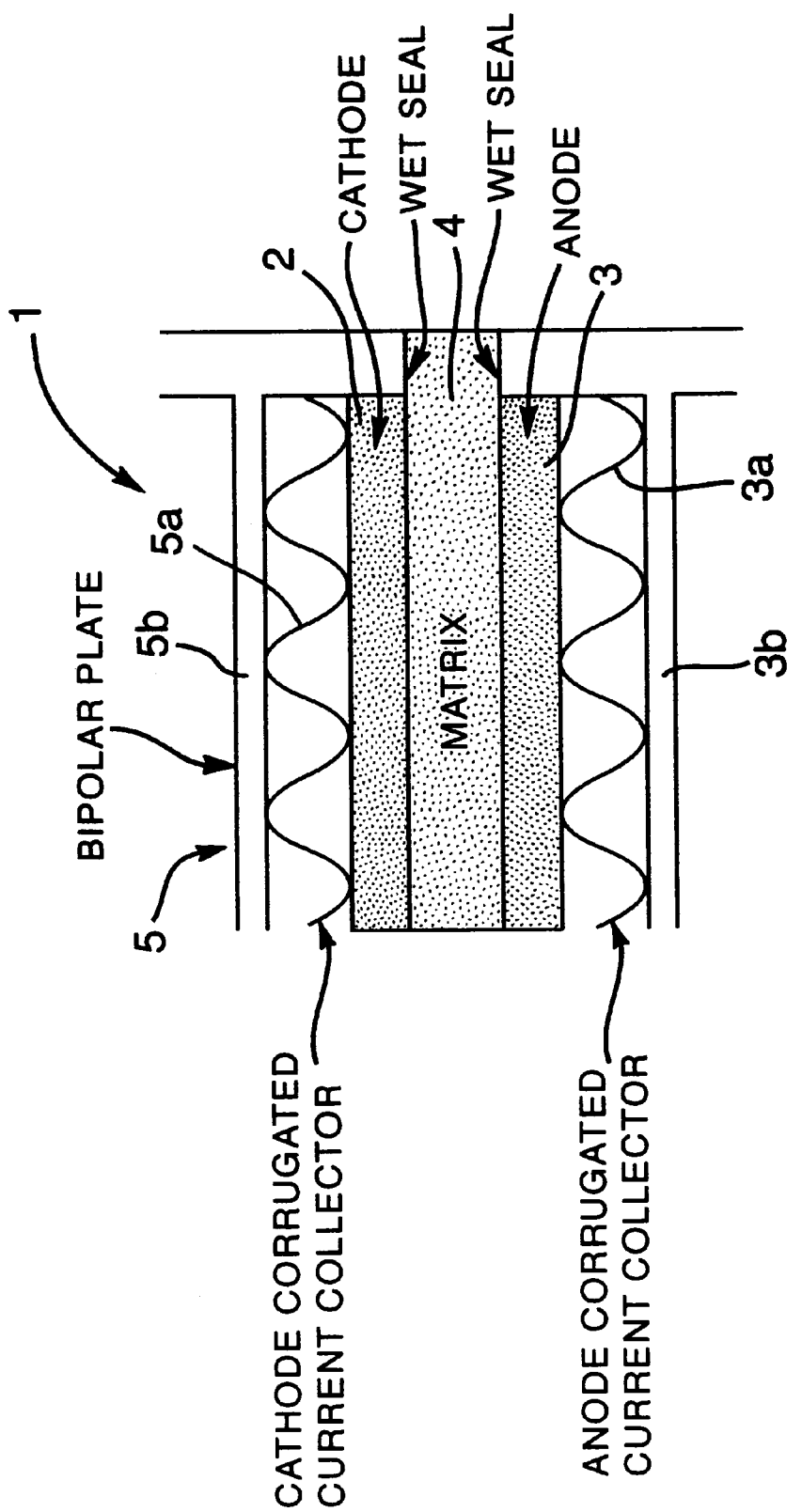
FIG. 1 schematically illustrates a fuel cell including cathode side hardware.

In accordance with the principles of the present invention, cathode side hardware 5 of the fuel cell 1 of FIG. 1 is coated with a conductive ceramic to obtain lower electrical esistivity for lower contact voltage loss. In further accord with the invention, $LiCoO_2$ and Co-doped $LiFeO_2$ are preferred coating materials. These materials are preferred because of their low solubility in alkali molten carbonate and low electrical resistivity (0.25 m$\Omega$-cm$^2$ for Co-doped $LiFeO_2$ in the cathode environment) as compared with that of the corrosion products of austenitic steels ($LiFeO_2$ (75 m$\Omega$-cm$^2$)).

In further accord with the invention, the conductive $LiCoO_2$ and Co-doped $LiFeO_2$ are preferably coated on the cathode side hardware, i.e., the cathode current collector and/or the bipolar plate, using a thin film sol-gel coating process. This process involves the dissolution of precursors containing the required metal ions in a suitable solvent to form the sol. The sol is coated on the hardware surface by a spray or dipping process, subsequently gelled, and dried, followed by densification and crystallization.

Drying is generally performed between room temperature and 200° C. The densification and recrystallization processes are usually carried out at temperatures above 350° C. The surface of the metal substrate may require degreasing and pickling to remove surface debris and oxide for better coating adhesion. Although 100% of coating coverage is not necessary for carbonate fuel cell application in terms of ohmic contact resistance, it is desirable to have >95% coverage of the surface by the ceramic coating to achieve the desired benefits of increased corrosion protection and reduced electrolyte loss. The resultant cathode side hardware can thus be provided with the required structure and phase assemblage to provide the desired properties.

The precursors for $LiCoO_2$ and Co-doped $LiFeO_2$ can be alkoxides, organometallic compounds, inorganic salts, organic salts or hydroxide. The solution can be aqueous based or solvent based. Several examples of the invention are described below.

Example I

In this example, preparation of aqueous based sols for depositing $LiCoO_2$ and Co-doped $LiFeO_2$ films on cathode side hardware is described. In this case, water-soluble precursors containing lithium, cobalt and iron are used as the starting materials. These precursors react in water to form a stable colloidal solution after adding ammonium hydroxide. For preparing the aqueous based $LiCoO_2$ sol, lithium hydroxide (LiOH) and cobalt acetate ($Co(C_2H_3O_2)_2H_2O$) are the precursor materials. At first, LiOH and $Co(C_2H_3O_2)_2 \cdot H_2O$ are dissolved separately in distilled water to form lithium hydroxide and cobalt salt solution. These two solutions are then quickly mixed together while stirring energetically. The hydrolysis of the mixture is promoted by slowly adding reagent ammonium hydroxide ($NH_4OH$). After adding the ammonium hydroxide, a milky brown, gel-like sol is instantaneously obtained. The prepared sol is stirred for 3 hours at room temperature. The final sol has a pH about 10. The sol remains stable and homogeneous for weeks.

A similar process is used for preparing Co doped $LiFeO_2$ sol. For developing sols with different cobalt doping levels, iron nitrate ($Fe(NO_3)_3 9H_2O$) and cobalt acetate ($Co(C_2H_3O_2)_2H_2O$) are first dissolved together in distilled water in an appropriate ratio. The mixture is then combined with lithium hydroxide (LiOH) solution (in distilled water) while stirring. Again, the hydrolysis of the mixture is achieved by slowly adding reagent ammonium hydroxide ($NH_4OH$). Milky blue, gel-like sol is instantaneously obtained after adding the ammonium.

Cathode side hardware sample sheets were then fabricated using the prepared sol-gels. The base hardware sample sheets are made from stainless steel. In particular, as-supplied commercial stainless steel sheets (316L) were cut into 5 cm×5 cm×0.5 cm in size, and then polished with abrasive paper and diamond paste to about 1 µm finishing. The polished sample sheets were cleaned in warm detergent water (65° C.) for 15 minutes to remove organic and inorganic debris from the sample surface. The cleaned sample sheets were rinsed and then de-oxided in a room temperature nitric acid (2N) solution. The sheets were then ready for coating after rinsing in de-ionized water followed by air-drying.

A dip-coating method was used. It was carried out in a dip-coater (Dip-master-201, Chemat Technology, Inc.) with temperature and atmosphere controls. A coating bath contained excess sol so as to coat the each substrate sheet to minimize any changes in the colloid concentration in the course of the coating. The coating was conducted in air atmosphere. Dip coating was simply performed by dipping the sheets into the sol followed by removal at a specified withdrawing rate. The film thickness was controlled by the sol viscosity and the withdrawing rate. All the dip-coatings are performed by withdrawing the sheets at the same withdrawing rate (~10 cm/sec).

Figure 2A:
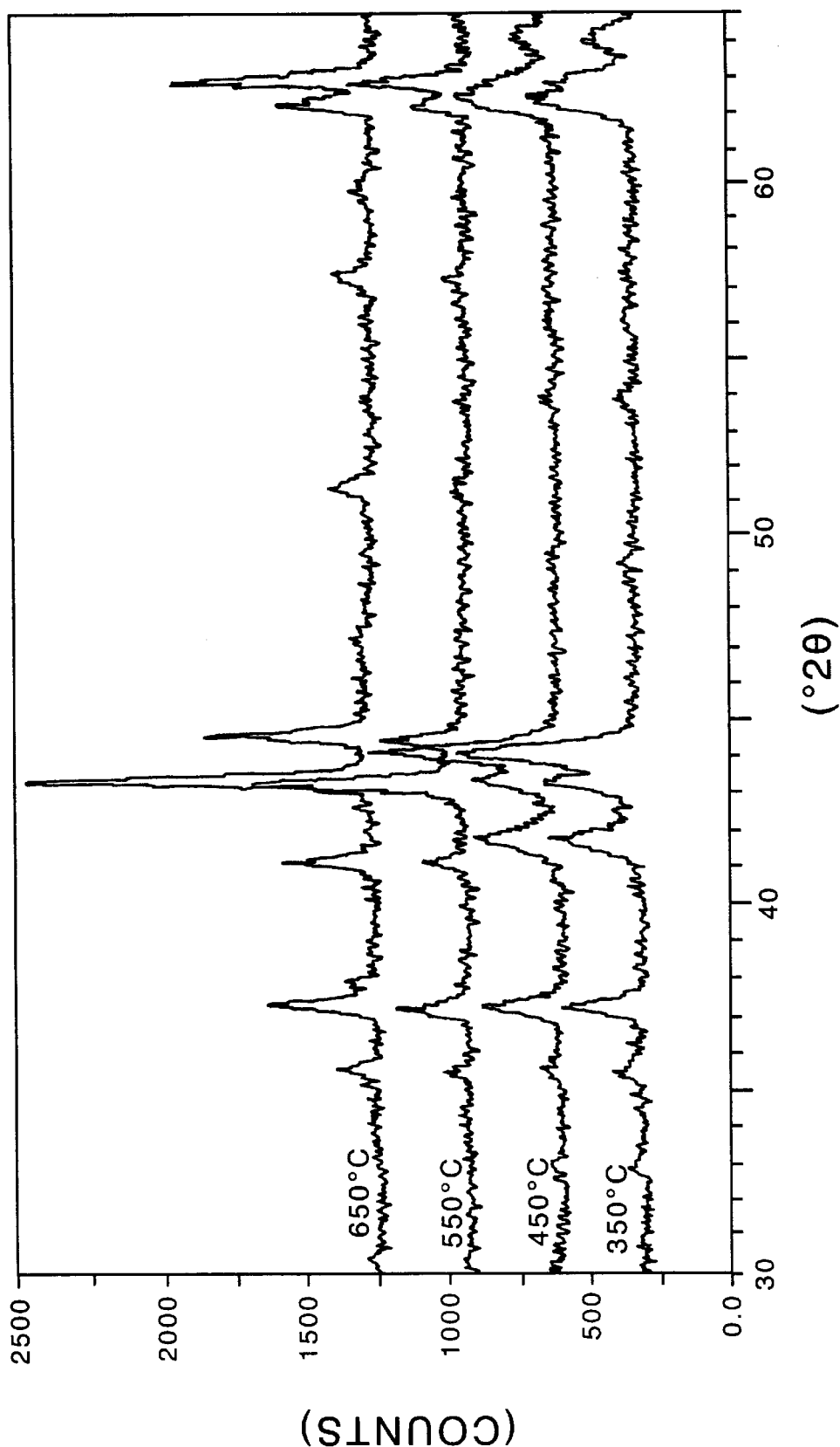
FIGS. 2A, 2B and 3A, 3B, show X-ray diffraction spectrum of conductive ceramics synthesized by a sol-gel technique as cathode side hardware coatings in accordance with the principles of the present invention.
Figure 2B:
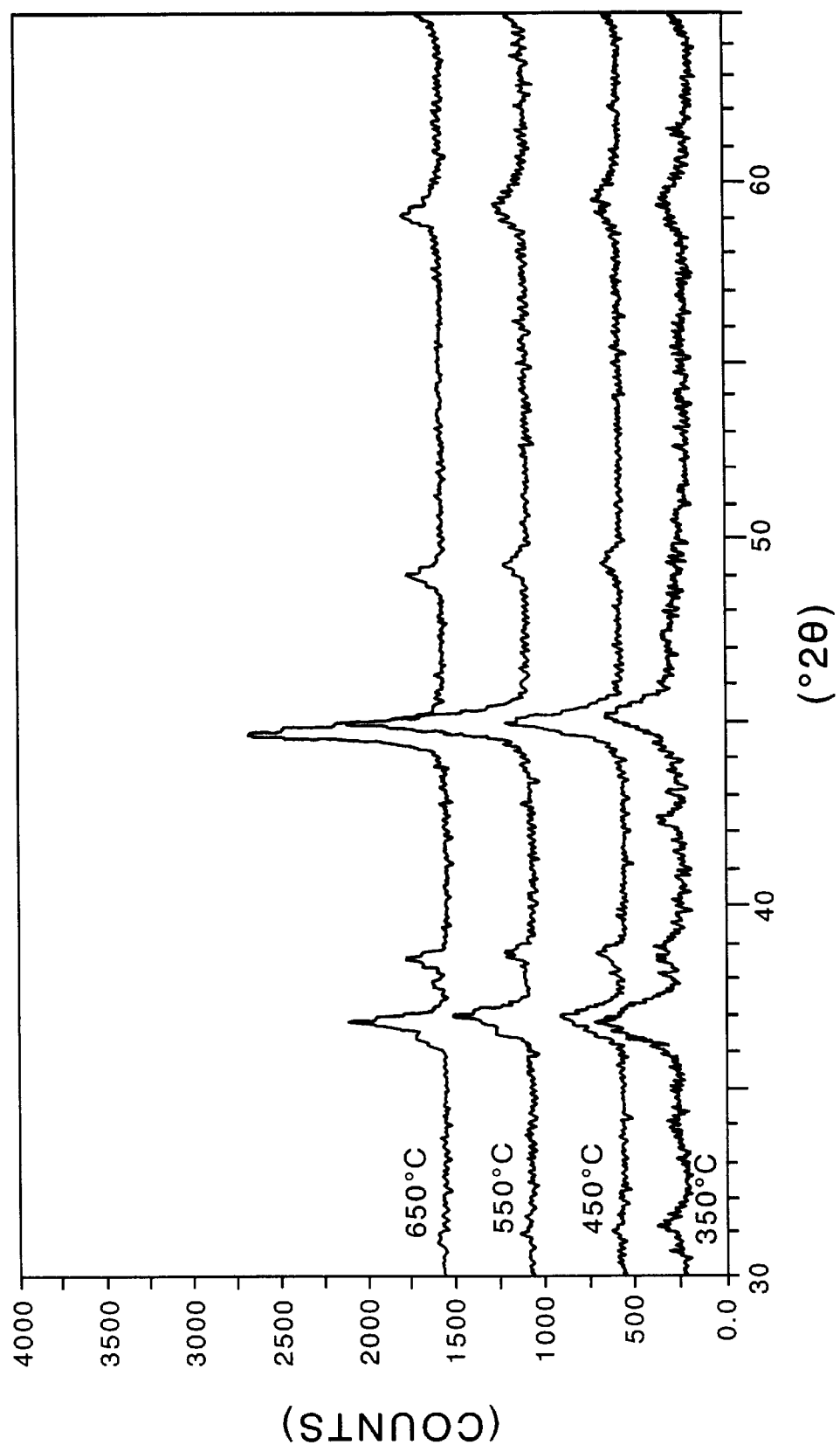

After the dipping, the films were dried at 100° C., followed by densification at 650° C. in air. The thin films appeared to be crack-free and bonded well onto each stainless steel sheet or substrate after densification at 650° C. for 3 hours. The coating thickness is about 1–5 µm thick. X-ray diffraction analysis (XRD) on the deposited sol-gel coating exposed to different temperatures from 350° C. to 650° C. in air showed that both Co-doped $LiFeO_2$ and $LiCoO_2$ phases formed at very low temperature (350° C.), without additionally detected phases. This can be seen in FIGS. 2A and 2B for the Co-doped $LiFeO_2$ and $LiCoO_2$ sol gel coatings, respectively.

The effect of thermal cycling on the integrity of the film coating on the cathode side hardware sheets was also evaluated. Hardware sheets with thin film coatings of $LiCoO_2$ and Co-doped $LiFeO_2$ experienced 15 thermal cycles from room temperature to 650° C. with a heating and cooling rate of 2° C./minute which is much more accelerated than normal fuel cell cycling. Examination of the post cycling specimens by optical microscopy and SEM revealed that the film was thermally compatible with the substrate, without detectable thermal stress induced cracks or microcracks.

Example II

In this example, the preparation of solvent based sols for depositing Co-doped $LiFeO_2$ and $LiCoO_2$ are described. The co-doped $LiFeO_2$ solution is prepared for iron (III) ethylhexano-isoproxide ($Fe(OOCC_7H_{15})(OC_3H_7)$), lithium ethoxide ($C_2H_5OLi$) and cobalt (II) hydroxide ($CO(OH)_2$. The $LiFeO_2$ and Co solutions are prepared separately. For preparing the $LiFeO_2$ solution, iron (III) ethylhexano-isoproxide ($Fe(OOCC_7H_{15})(OC_3H_7)$ dissolved in anhydrous ethanol is added with lithium ethoxide solution (in anhydrous ethanol) slowly while stirring under nitrogen atmosphere. The Co solution is prepared by suspending firstly cobalt (II) hydroxide in water followed by slowly adding acetic acid. The resulting solution is stirred for 30 minutes, and then water is added to make it to the final volume. Finally, this Co solution is mixed with acetic acid. The Co-doped $LiFeO_2$ sol is prepared by combining the $LiFeO_2$ and Co solutions. While stirring, different amounts of Co solution are added drop-wise to the $LiFeO_2$ solution to obtain Co-doped $LiFeO_2$ sol with desired Co doping levels. The shelf-life of the as-prepared sols is more than several months.

$LiCoO_2$ sol is prepared from cobalt (II) methoxyethoxide solution ($Co(OCH_2CH_2OCH_3)_2$) dissolved in anhydrous ethanol) and lithium ethoxide ($C_2H_5OLi$) solution (lithium dissolved in anhydrous ethanol). At first, lithium ethoxide solution is added into cobalt (II) methoxyethoxide solution dropwise while stirring. Then, ethanol is added to the mixture. Finally, several drops of water in acetic acid is added to the solution.

The fabrication (preparation and coating) of cathode side hardware sample sheets is carried out in this example in essentially the same manner as in Example I. The resultant cathode side stainless sheets have thin film coatings which are crack-free and which are bonded well to the stainless steel after densification at 650° C. for 3 hours.

Figure 3A:
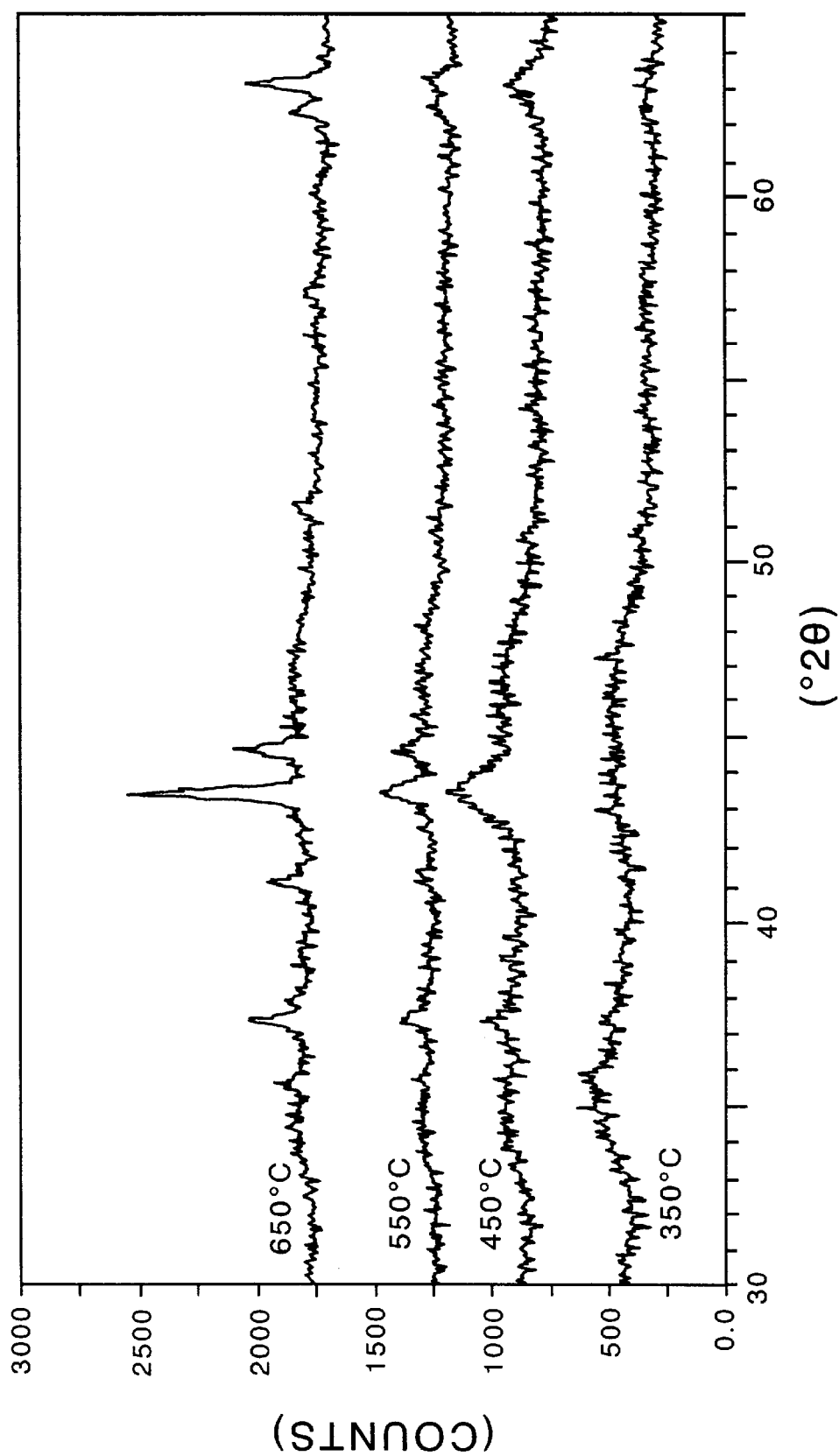
Figure 3B:
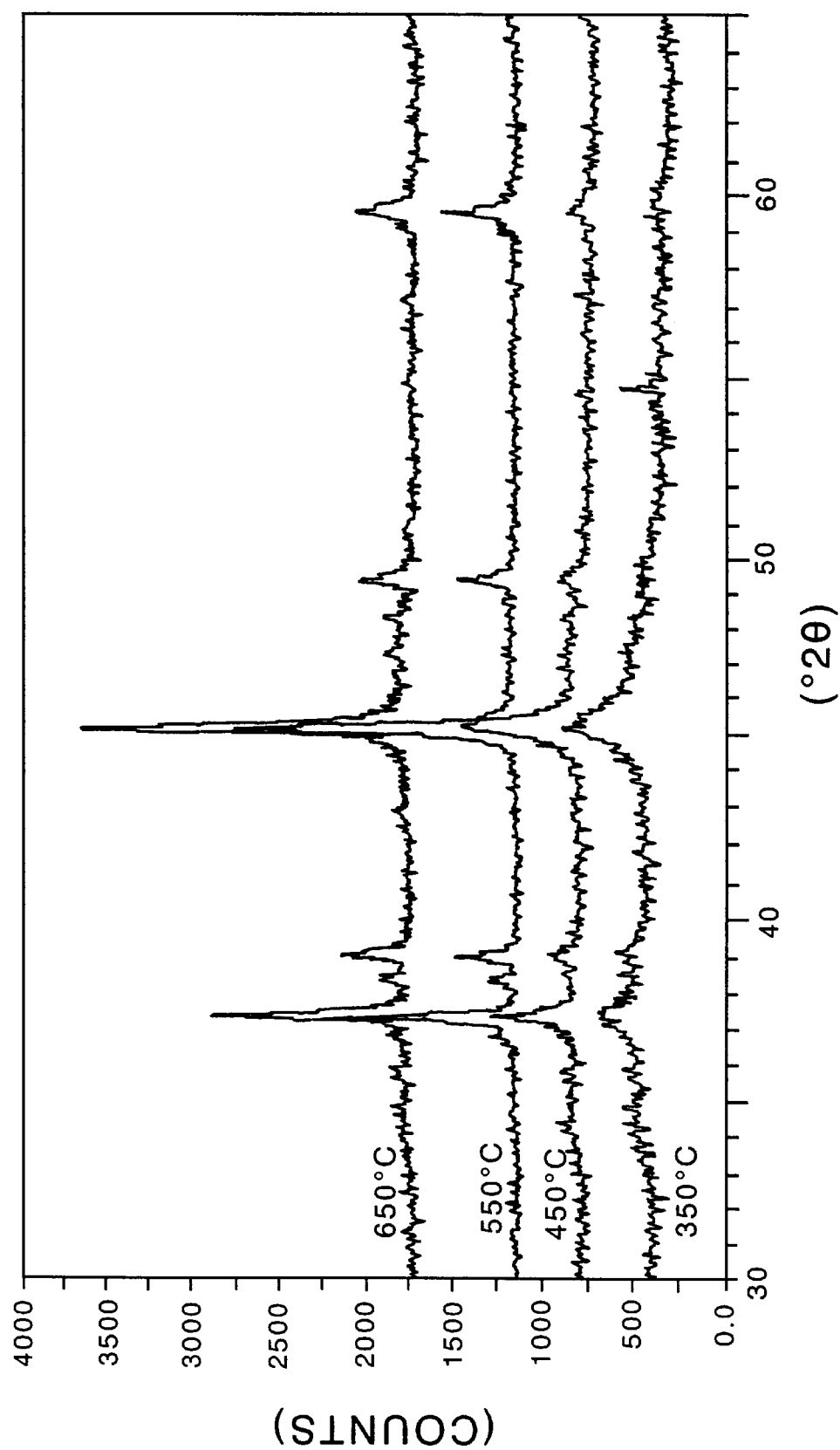
Figure 4A:
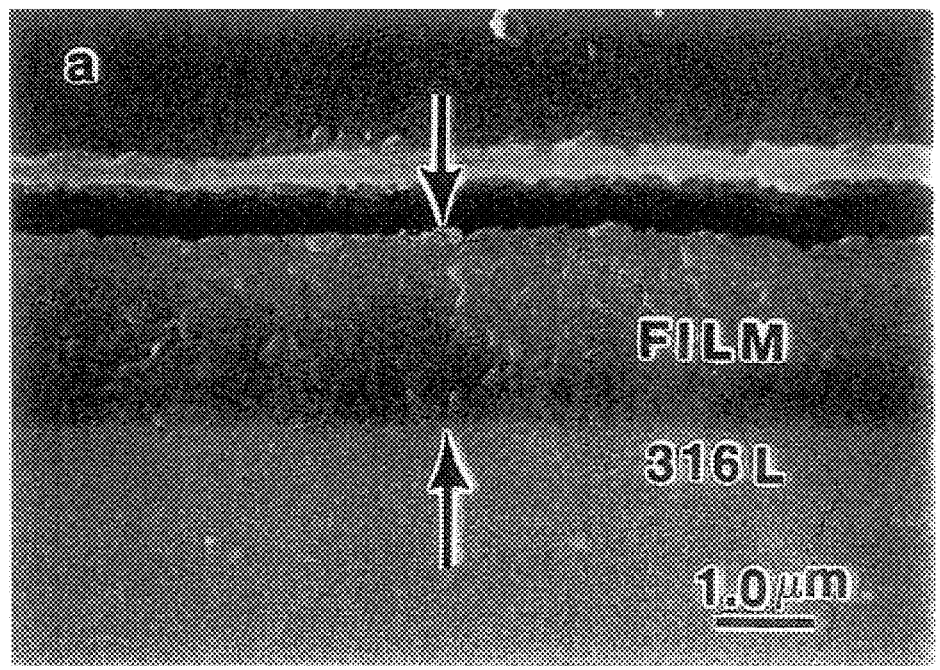
FIGS. 4A and 4B illustrate cross sectional SEM micrographs of metallic members coated with the conductive ceramics sol-gels of FIGS. 2 and 3.
Figure 4B:
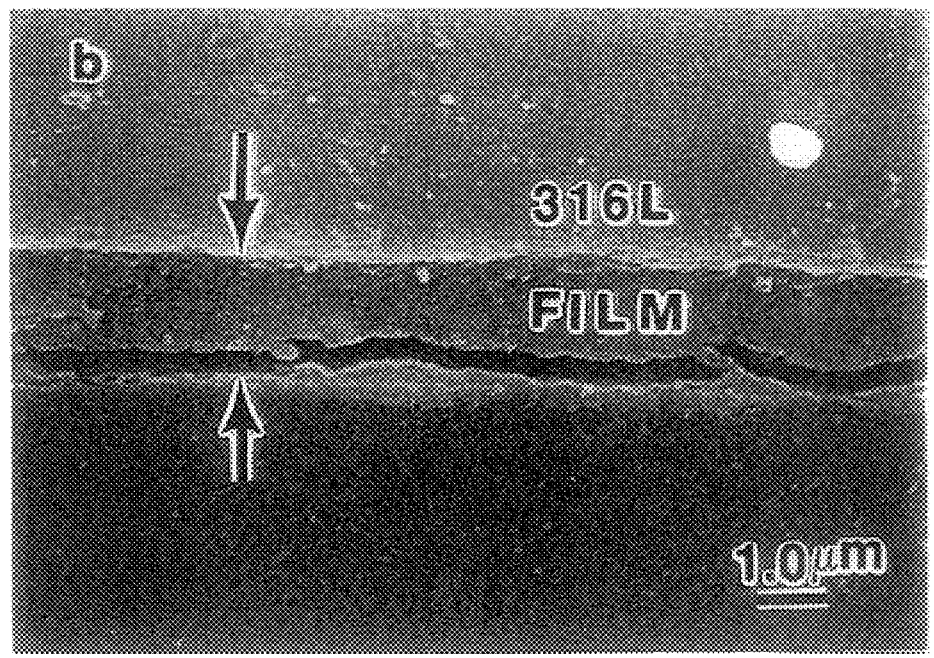

FIGS. 3A and 3B show X-ray diffraction spectra for the Co-doped $LiFeO_2$ and $LiCoO_2$ sol-gel coatings, respectively, of this example exposed to different temperatures from 350 to 650° C. Co-doped $LiFeO_2$ and $LiCoO_2$ phases started to form at a slightly higher temperature (450° C.) than in the previous example. FIGS. 4A and 4B show the $LiCoO_2$ and Co-doped $LiFeO_2$ films, respectively, as applied to the cathode side stainless steel hardware after heat treating at 650° C. for 3 hours. Excellent film density and film-substrate bonding are achieved.

The corrosion resistance of the $LiCoO_2$ and Co-doped $LiFeO_2$ (solvent-based sols) coated stainless steel cathode side hardware was evaluated under the cathode-side conditions of a carbonate fuel cell at 650° C. A typical carbonate mixture consisting of 62 mol % $Li_2CO_3$ and 38 mol % $K_2CO_3$ was used in the evaluation. The coatings were evaluated for 500 hours at 650° C.

Figure 5A:
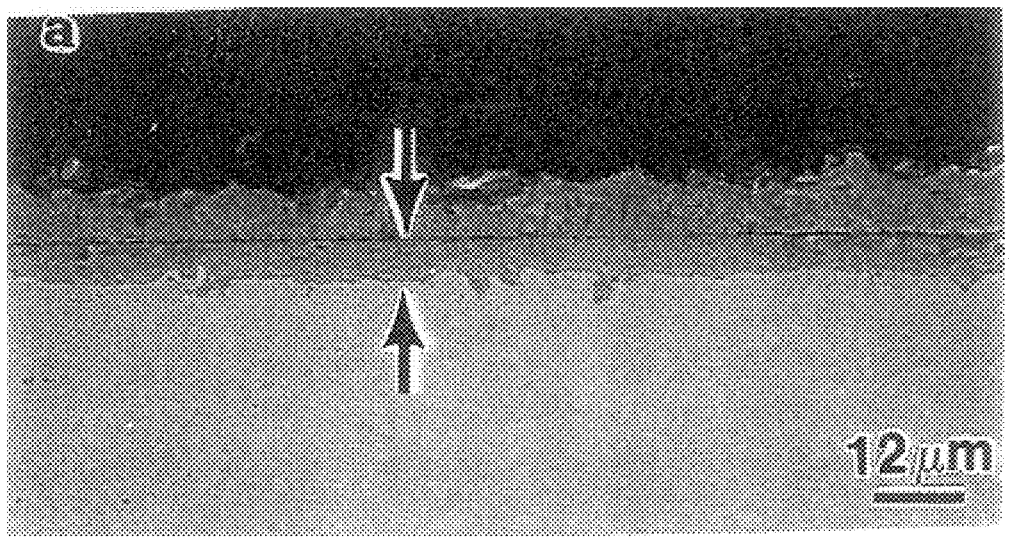
FIGS. 5A, 5B and 5C show cross sectional SEM micrographs of cathode side hardware coated with the conductive ceramic sol-gels of FIGS. 2 and 3, and uncoated cathode side hardware after being subjected to a corrosion environment.
Figure 5B:
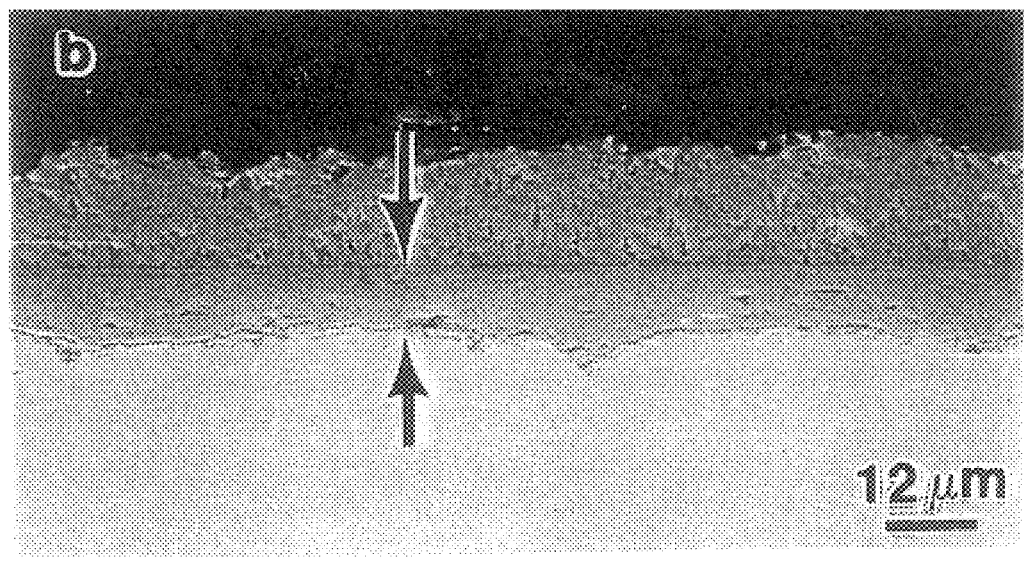
Figure 5C:
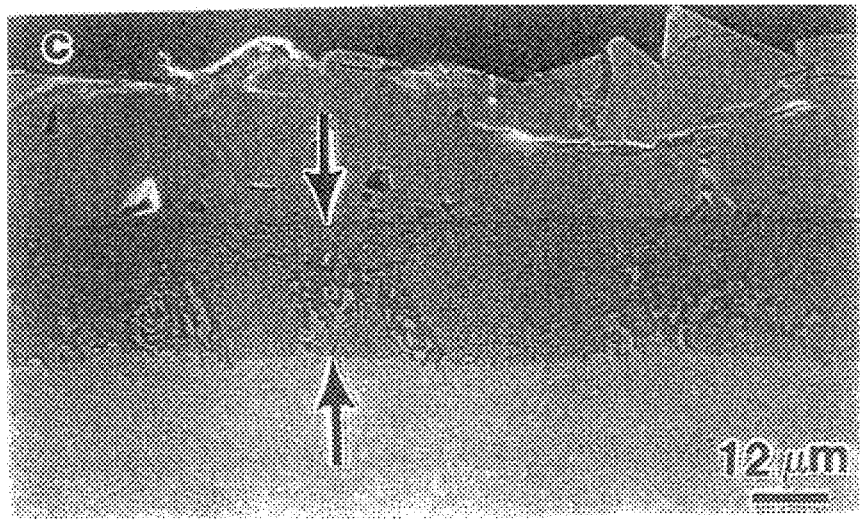

The cross sectional SEM observations, as shown in FIGS. 5A and 5C, clearly indicated that the coating of the coated hardware, both $LiCoO_2$ (FIG. 5A) and Co-doped $LiFeO_2$ (FIG. 5B), have significantly reduced the thickness of the corrosion scale, as compared to uncoated hardware (FIG. 5C). More particularly, the corrosion scales show a similar dual-layered structure whether or not sol-gel coated. However, for the coated stainless steel hardware, the outer oxide scale may have been denser to better protect the inner Cr-rich scale. Consequently, the Cr-rich inner scale of the coated sheets was denser and more protective to reduce the overall corrosion rate.

Example III

In this example, solvent-based solutions are prepared by using acetates as precursors for $LiCoO_2$ coating. Citric acid $HO_2CCH_2C(OH)(CO_2H)CH_2CO_2$, hydrated lithium acetate $Li(OOCCH_3) \cdot 2H_2O$ and hydrated Co acetate $Co(OOCCH_3)_2 \cdot 4H_2O$ are dissolved in sequence into ethylene glycol. Solution concentration can be adjusted to vary the viscosity. With increasing temperature, the solution becomes thicker due to solvent evaporation. A typical concentration which is used for coating the cathode side hardware (in this example, a stainless steel corrugated current collector ("CCC")) is 0.02 mole of $HO_2CCH_2C(OH)(CO_2H)CH_2CO_2$, 0.02 mole of $Li(OOCCH_3) \cdot 2H_2O$ and 0.02 mole of $Co(OOCCH_3)_2 \cdot 4H_2O$ in 20 ml ethylene glycol. The CCC sample is then dip-coated, dried in air, baked in an oven at ~60° C. to evaporate water, and slowly heated up to 650° C. to form the conductive ceramic sol gel coating. The sample preparation and coating processes are essentially the same as those described in Example I.

Figure 6:
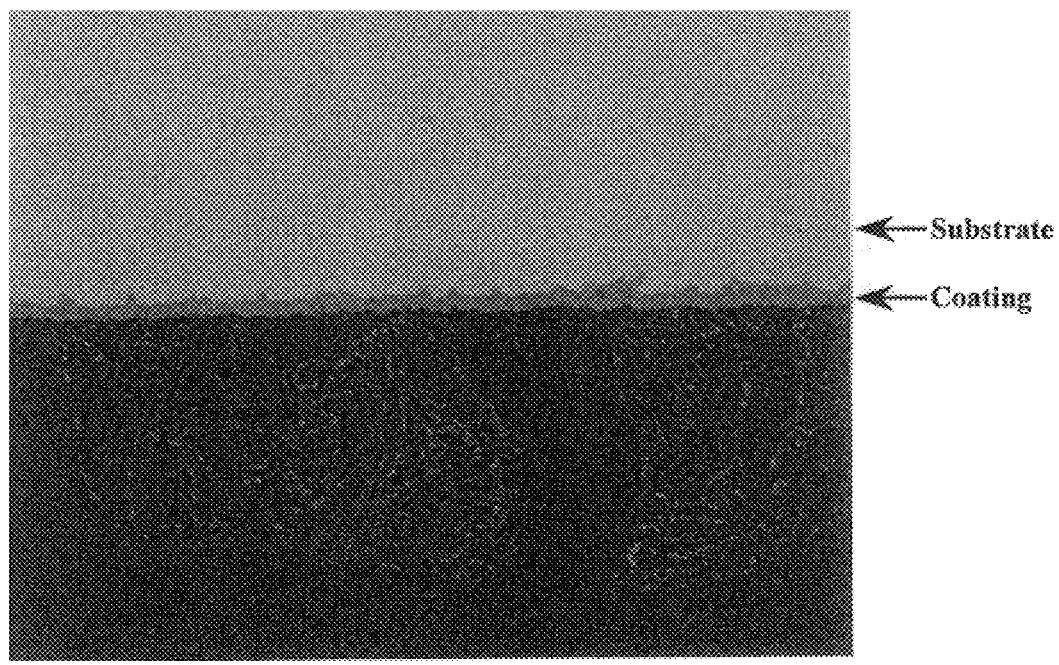
FIG. 6 shows a micrograph of a further conductive ceramic sol-gel coating used to fabricate cathode side hardware in accordance with the principles of the present invention.
Figure 7:
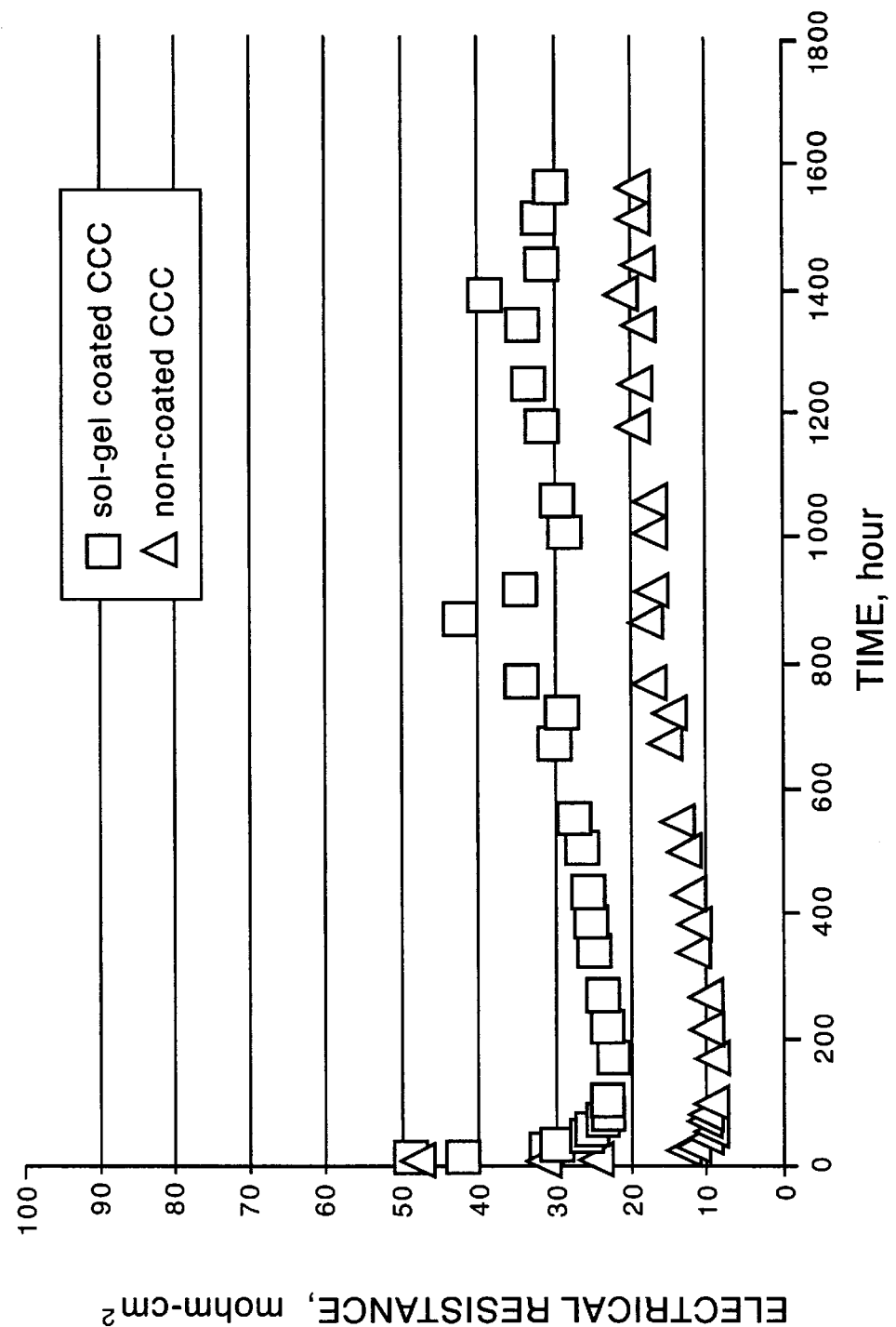
FIG. 7 shows the electrical resistivity of uncoated cathode side hardware and cathode side hardware coated with conductive ceramic sol-gel coatings in accordance with the invention.
Figure 8:
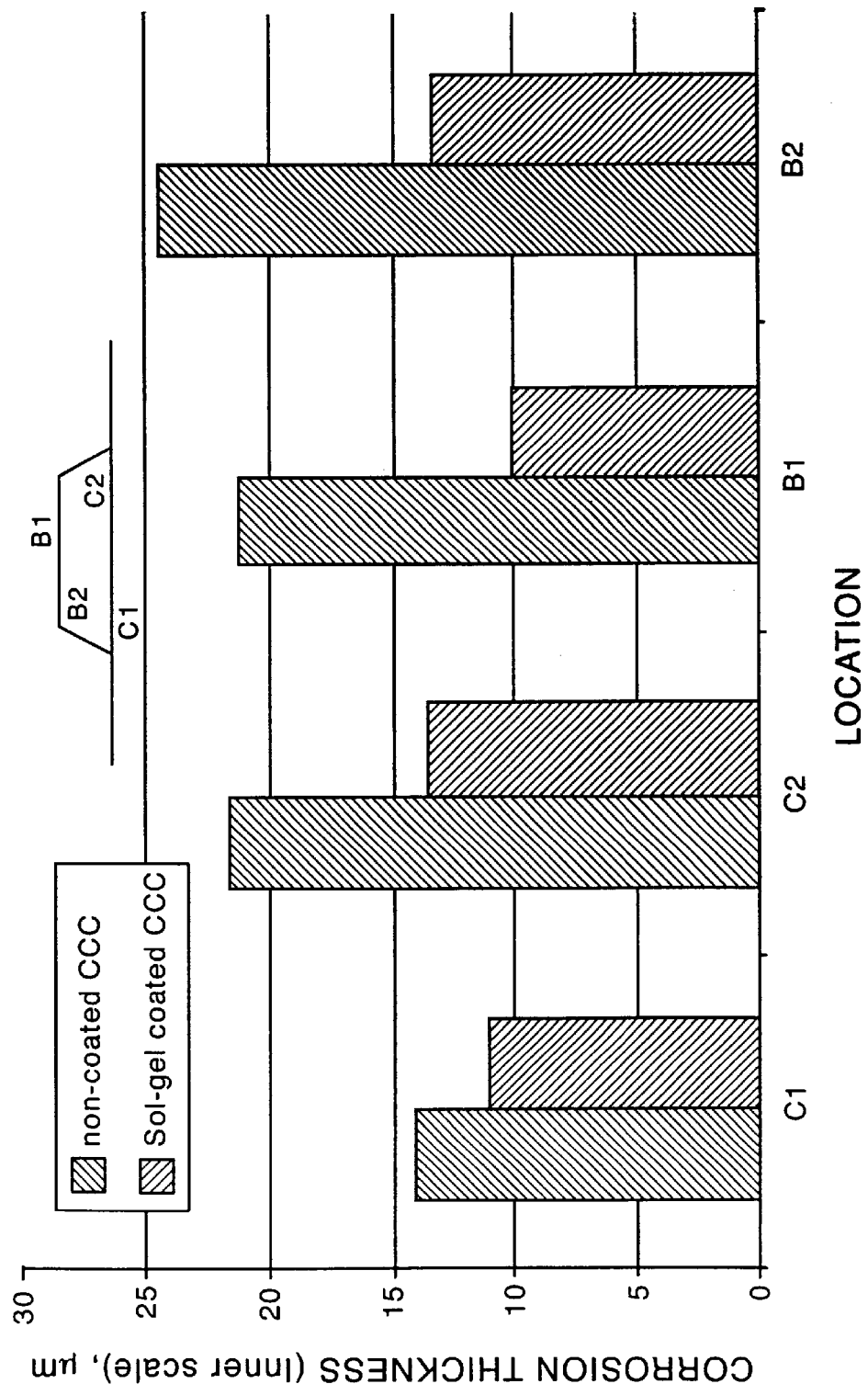
FIG. 8 illustrates the effect of hot corrosion both on cathode side hardware coated with the conductive sol-gel coatings in accordance with the invention and on uncoated cathode side hardware.

FIG. 6 shows a micrograph of the coating derived from the above solvent based solution. The thickness of the coating is about 5 µm. FIG. 7 shows the out-of-cell electrical resistivity evaluation of the coated CCC, revealing electrical conductivity comparable to the non-coated stainless steel. However, the corrosion resistance of the coated stainless steel CCC is significantly better than that of the non-coated one, as shown in FIG. 8 for various sections B1, B2, C1 and C2 of the coated CCC. Furthermore, the electrolyte lost to the surface of the coated cathode current collector is about 30% less than that on the surface of the non-coated one, indicating a much less electrolyte loss and longer fuel cell life.

Example IV

In this example, inorganic nitrates, such as lithium nitrate $LiNO_3$ and hydrated $Co(NO_3)_2 6H_2O$, are used as the precursors for deriving a $LiCoO_2$ sol gel ceramic coating. Ethylene glycol is used as the solvent. The solution preparation procedure and coating processes are similar to those in Example III. Adjusting precursor concentration and temperature can vary viscosity of the solution. The sample preparation and coating processes are essentially the same as those described in Example I. The sol gradually turns to a gel when the temperature was slowly increased to 140° C. A similar coating morphology is obtained as in Example III.

Example V

In this example, preparation of water-base solutions, LiOH and $Co(OOCCH_3)_2$, are used as the precursors of $LiCoO_2$. The precursors were dissolved in deionized water, and $NH_4OH$ was added to adjust the pH value of the solution to about 10. The pH is important to optimize the subsequent gelation process. The sample preparation and coating processes are essentially the same as those described in Example I. The coating can be applied by dipping or spraying. The coated samples are dried at below 100° C.

Crystallized $LiCoO_2$ starts to form at 450° C. upon heating and final dense ceramic coating is produced at 650° C.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A carbonate fuel cell comprising:

a cathode;

an anode;

a matrix for storing carbonate electrolyte disposed between said anode and cathode;

a cathode current collector situated adjacent said cathode;

a bipolar plate situated adjacent said cathode current collector; and wherein at least one of said cathode current collector and said bipolar plate includes a coating of an electrically conductive ceramic obtained by the sol-gel process, said coating of electrically conductive ceramic comprising one of $LiCoO_2$ and Co-doped $LiFeO_2$ and having a thickness of between 1 $\mu$m and 5 $\mu$m.

2. A carbonate fuel cell in accordance with claim 1 wherein both said cathode current collector and said bipolar plate include the coating of electrically conductive ceramic obtained by the sol-gel process.

3. A method of making a carbonate fuel cell comprising:

coating at least one of a cathode current collector and a bipolar plate with an electrically conductive ceramic using a sol-gel process;

said coating of electrically conductive ceramic comprises one of $LiCoO_2$ and Co-doped $LiFeO_2$ and has a thickness of between 1 $\mu$m and 5 $\mu$m; and assembling said cathode current collector and said bipolar plate with a cathode, an anode, and a matrix for storing carbonate electrolyte to form said carbonate fuel cell.

4. A method of making a carbonate fuel cell comprising:

coating both a cathode current collector and a bipolar plate with an electrically conductive ceramic using a sol-gel process;

said coating of electrically conductive ceramic comprises one of $LiCoO_2$ and Co-doped $LiFeO_2$ and has a thickness of between 1 $\mu$m and 5 $\mu$m; and assembling said cathode current collector and said bipolar plate with a cathode, an anode, and a matrix for storing carbonate electrolyte to form said carbonate fuel cell.

* * * * *